(12) United States Patent
Hamar et al.

(10) Patent No.: US 11,378,395 B1
(45) Date of Patent: Jul. 5, 2022

(54) ELECTRO-OPTICAL LEVEL APPARATUS

(71) Applicant: Hamar Laser Instruments, Inc., Danbury, CT (US)

(72) Inventors: Martin R. Hamar, Wilton, CT (US); Carlos Araujo, Danbury, CT (US)

(73) Assignee: Hamar Laser Instruments, Inc., Danbury, CT (US)

( * ) Notice: Subject to any disclaimer, the term of this patent is extended or adjusted under 35 U.S.C. 154(b) by 0 days.

(21) Appl. No.: 17/477,081

(22) Filed: Sep. 16, 2021

Related U.S. Application Data

(60) Provisional application No. 63/137,357, filed on Jan. 14, 2021.

(51) Int. Cl.
*G01C 9/32* (2006.01)
*G01C 9/06* (2006.01)

(52) U.S. Cl.
CPC ............... *G01C 9/32* (2013.01); *G01C 9/06* (2013.01); *G01C 2009/066* (2013.01)

(58) Field of Classification Search
None
See application file for complete search history.

(56) References Cited

U.S. PATENT DOCUMENTS

| | | | |
|---|---|---|---|
| 3,863,067 A * | 1/1975 | Gooley | G01C 9/06 33/366.16 |
| 4,045,129 A | 8/1977 | Hamar | |
| 4,297,031 A | 10/1981 | Hamar | |
| 4,382,680 A | 5/1983 | Hamar | |
| 4,468,119 A | 8/1984 | Hamar | |
| 4,483,618 A | 11/1984 | Hamar | |
| 4,566,202 A | 1/1986 | Hamar | |
| 4,679,940 A | 7/1987 | Hamar | |
| 4,714,344 A | 12/1987 | Hamar | |
| 4,844,618 A | 7/1989 | Hamar | |
| 5,218,771 A * | 6/1993 | Redford | G01C 9/06 250/231.1 |
| 5,224,052 A | 6/1993 | Hamar | |
| 5,302,833 A | 4/1994 | Hamar et al. | |
| 5,307,368 A | 4/1994 | Hamar | |

(Continued)

FOREIGN PATENT DOCUMENTS

| | | | | |
|---|---|---|---|---|
| DE | 10026523 A1 * | 4/2001 | ............... | G01C 9/06 |
| EP | 1524496 A1 * | 4/2005 | ............... | G01C 9/06 |

*Primary Examiner* — Christopher W Fulton
(74) *Attorney, Agent, or Firm* — Gerald E. Hespos; Michael J. Porco; Orco

(57) ABSTRACT

An electro-optical level employs a bubble tube with opposite first and second ends. First and second light emitters are disposed respectively beyond the first and second axial ends of the tube and direct light toward the ends of the bubble in the tube. Electro-optical detectors are aligned substantially parallel to the axis of the tube and are spaced from the tube. First and second beams from the respective first and second light emitters scatter as the beams impinge upon the bubble. However, the scattered light from each light emitter will form a bright spot on the respective electro-optical detector at a point corresponding to the end of the bubble. The locations of the bright spots are detected by the electro-optical detectors and precisely determine the locations of the opposite ends of the bubble regardless of dimensional changes of the tube or the bubble due to temperature variations.

13 Claims, 5 Drawing Sheets

(56) References Cited

U.S. PATENT DOCUMENTS

| | | | |
|---|---|---|---|
| 5,576,826 A | 11/1996 | Hamar | |
| 5,636,018 A * | 6/1997 | Hirano | G01B 11/26 33/291 |
| 5,847,820 A | 12/1998 | Hamar | |
| 5,929,984 A | 7/1999 | Hamar | |
| 6,038,050 A | 3/2000 | Hamar | |
| 6,292,303 B1 | 9/2001 | Hamar | |
| 6,343,422 B1 * | 2/2002 | Takahashi | G01C 9/06 33/366.16 |
| 6,704,115 B1 | 3/2004 | Hamar | |
| 6,825,923 B2 | 11/2004 | Hamar et al. | |
| 7,298,888 B2 | 11/2007 | Hamar | |
| 7,350,305 B2 * | 4/2008 | Molitorisz | G01C 9/04 33/366.16 |
| 7,497,021 B2 * | 3/2009 | Perchak | G01C 9/06 33/366.16 |
| 7,526,870 B2 * | 5/2009 | Klapper | G01C 9/06 33/366.11 |
| 7,708,204 B2 | 5/2010 | Hamar | |
| 7,818,891 B2 * | 10/2010 | Roemhild | G01C 9/24 33/366.16 |
| 7,906,737 B2 * | 3/2011 | Freydank | G01G 23/10 177/25.13 |
| 8,857,069 B2 * | 10/2014 | Adegawa | G01C 9/00 33/291 |
| 2002/0162235 A1 * | 11/2002 | Rando | G01C 9/06 33/366.16 |
| 2008/0172894 A1 * | 7/2008 | Chang | G01C 9/06 33/366.16 |
| 2014/0283399 A1 * | 9/2014 | Fessler | G01C 15/004 33/291 |

* cited by examiner

ELECTRO-OPTICAL LEVEL APPARATUS

This application claims priority on U.S. Provisional Application No. 63/137,357, filed Jan. 14, 2021, the entire disclosure of which is incorporated herein by reference.

BACKGROUND

1. Field of the Invention

The invention relates to an electro-optical level apparatus.

2. Related Art

A typical carpenter's level is an elongated generally rectangular structure having opposed first and second ends. Planar top and bottom faces are aligned parallel to one another and extend between the ends. The top and bottom faces are the portions of the prior art level that will be placed against another surface for assessing horizontal or vertical alignment of that surface.

A typical prior art level includes a glass tube partly filled with a liquid spirit. The portion of the tube that is not filled by the level forms a bubble. Movement of the level will cause the liquid to shift within the tube and hence will cause a repositioning of the bubble. The tube includes a pair of lines that are spaced apart by a distance approximately equal to the length of the bubble in the tube. When the tube is aligned horizontally, the liquid will be disposed symmetrically in the tube, and the bubble will be positioned precisely between the lines.

The prior art carpenter's level can be used by placing the top or bottom face of the level on a substantially horizontal surface. The relative position of the bubble in the tube provides an indication of the closeness of the level to a horizontal alignment. The surface on which the level is supported may be adjusted to position the bubble between the lines of the tube, and hence to achieve a fairly exact horizontal alignment of the surface on which the level is supported.

The precision that can be obtained with the prior art level is dependent upon the eyesight of the user and the ability of the user to determine the positions of the ends of the bubble relative to the lines on the glass tube. This ability will depend at least upon the optical alignments of the user of the level relative to the bubble tube. Precision can be fairly good if the user has good eyesight and if the user can be positioned so that the line of site is perpendicular to the axis of the tube. However, the realities of a construction or manufacturing site often do not permit the user of the level to be positioned perfectly relative to the bubble tube. For example, the level may be positioned at a location significantly above the head of the user or at a position where the line of sight is at an acute angle to the axis of the bubble tube. Either of these fairly common uses of a level significantly reduces accuracies that can be obtained by the typical prior art carpenter's level.

The boundary between the gas and the liquid in the bubble tube is fairly precise. However, the bubble is an ellipsoid with curved boundaries. A viewer necessarily sees the curved boundaries between the gas and the bubble in the bubble tube, and hence the boundary between the bubble and the liquid appears as a fairly dark broad line. The apparent width of the line that defines the bubble can lead to a lack of precision by the user. In particular, accuracy will vary depending upon which part of the apparently broad boundary of the bubble aligns with the positioning indicia on the glass tube.

The prior art includes electro-optical devices that attempt to determine the degree of levelness. For example some devices utilize an Archimedes spring with a variable capacitor. Other devices use a pendulum system and rely upon the alignment of the pendulum to identify a gravitational axis. These devices tend to be large, heavy, fragile and costly. Other electro-optical devices have attempted to identify the position of the bubble in a level. These devices have taken several forms, such as attempts to identify the midpoint of the bubble or to identify an angle of the surface of the liquid. The known electro-optical devices with a bubble level do not provide the desired degree of precision.

The assignee of the invention disclosed herein also owns U.S. Pat. No. 7,298,888. The electronic level sensor disclosed in U.S. Pat. No. 7,298,888 uses a bubble level having a tube with a liquid therein and a bubble formed by the liquid in the tube. A substantially linear light source is directed toward and through the tube. A linear lens array focuses the light passing through the bubble tube onto a linear lens array for producing an image of the bubble in the bubble level. The lens array employs the focused light to identify endpoints of the bubble in the tube and then employs locational data for the endpoints to assess levelness. The electro-optical level disclosed in U.S. Pat. No. 7,298,888 also includes an output display to display the data obtained by the level. The disclosure of U.S. Pat. No. 7,298,888 is incorporated herein by reference.

The apparatus disclosed in U.S. Pat. No. 7,298,888 generally works well. However, the apparatus is fairly complex and therefore costly. Furthermore, the apparatus is complicated by the fact that the dimensions of the level, the level tube and the bubble vary with changes in temperature.

The assignee of the invention disclosed herein also manufactures and sells laser alignment devices. The typical laser alignment device includes an apparatus to emit one or more collimated laser beams and at least one photoelectric target to sense the location on the target that is impinged by the collimated laser beam. Some devices sold by the assignee of this invention use a rotating pentaprism as part of the laser emitter. The pentaprism effectively sweeps a laser plane, and targets can be used to identify positions of other objects relative to that laser plane. Laser alignment devices are disclosed in U.S. Pat. Nos. 6,038,050 and 6,292,303, both of which are assigned to the assignee of this invention, and one embodiment is marketed by the assignee of this invention under the product name Hamar Laser Model 743.

There often are advantages to have the beam or plane produced by the laser alignment device coincide with a horizontal plane. For this purpose, the known laser alignment devices have one or more bubble levels mounted on the device. The technician who is performing the laser alignment observes the bubble level and adjusts the laser alignment device manually to bring the laser alignment device into an approximately horizontal alignment. However, the accuracy available with this visual observation and manual adjustment is much less than the accuracy enabled by the collimated laser beam and the target. Thus, the ability to align objects relative to a horizontal plane is limited by the ability of the technician to use a conventional prior art bubble level as part of a manual adjustment of the laser alignment apparatus. A greater leveling precision of the laser alignment apparatus at a reasonable price would be received very well in the marketplace.

An object of the subject invention is to provide an electro-optical and/or laser level apparatus with improved accuracy, lower complexity and lower cost.

SUMMARY

The invention relates to an electro-optical level that employs a bubble tube having opposite first and second ends and with a sufficient quantity of a liquid in the tube to form a bubble that moves in the tube as the opposite first and second ends of the tube are shifted relative to one another and relative to a gravitational axis. The electro-optical level also includes first and second light emitters disposed respectively beyond the opposite first and second axial ends of the tube and aligned to direct light toward one another and hence toward the bubble in the tube. In one embodiment, the first and second light emitters are expanding LED diodes to produce expanding light beams. The LEDs may emit laser light, but also may emit incongruent light. In other embodiments, the laser light emitted by the diode is directed through an array of lenses to produce a collimated beam.

The electro-optical level apparatus also includes at least one optical detector and, in some embodiments, first and second optical detectors aligned substantially parallel to the axis of the tube and spaced from the tube. The optical detectors may be commercially available optical detectors, such as silicon cell detectors, PSD (position-sensitive detection) cell arrangements or CCDs (charge coupled devices) that are operative to determine the center of the energy of light impinging thereon.

The electro-optical level apparatus of some embodiments can use laser diodes that produce collimated beams instead of the expanding light diodes that produce expanding beams. However, embodiments that use laser diodes that produce collimated beams preferably also will use a detector with a PSD cell arrangement, a CCD optical detector or a video detector.

The electro-optical level apparatus is used by directing first and second light beams from the respective first and second LEDs toward the opposite first and second ends of the bubble tube. The light from each LED will scatter as the beam impinges upon the bubble. However, the scattered light from each LED will form a bright spot on the respective optical detector at a point corresponding to the end of the bubble. The locations of the bright spots are detected by the optical detectors and precisely determine the locations of the opposite ends of the bubble regardless of any dimensional changes in the tube or the bubble due to temperature variations. More particularly, the bubble moves relative to the expanding light radiation patterns as the bubble tube becomes more or less level. Thus, the spot on one optical detector will get brighter, and the spot on the other optical detector will get dimmer, thereby generating voltages that are proportional to the displacement of the bubble relative to the center. A control unit is connected to the detectors and converts the locational data received from the detectors (and corresponding to the ends of the bubble) into data that identifies the degree of the levelness of the bubble tube. Embodiments that use a collimated laser beam and a CCD detector rely upon the position of the spot or center of energy of the light beam reflected from the end of the bubble without assessing the brightness of that spot. Thus, the embodiments that use a collimated laser beam and a CCD detector can have a significantly simpler control unit.

Output from the control unit maybe used to adjust the alignment of a device to which the electro-optical level is attached into an alignment that is more nearly horizontal. For example, at least one electro-optical level may be mounted on another apparatus, such as a laser alignment apparatus, and may be used to adjust the other apparatus into alignment. For example, two of the electro-optical levels may be mounted on an apparatus, and the axes of the respective bubble tubes may be perpendicular to one another. Outputs from the control unit may be used to adjust the apparatus into a horizontal alignment. In this regard, servo motors may be mounted on the apparatus and may be operated pursuant to signals from the control unit. Each servo motor may be connected to a height-adjustable leg. The servo motors may be operated pursuant to signals from the control unit to extend or retract the height adjustable legs to make the apparatus level. These adjustments may be carried out based on calculations performed by the control unit or may be carried out in increments based on an iterative process until the apparatus to which the levels are mounted becomes level.

DETAILED DESCRIPTION

Figure 1:
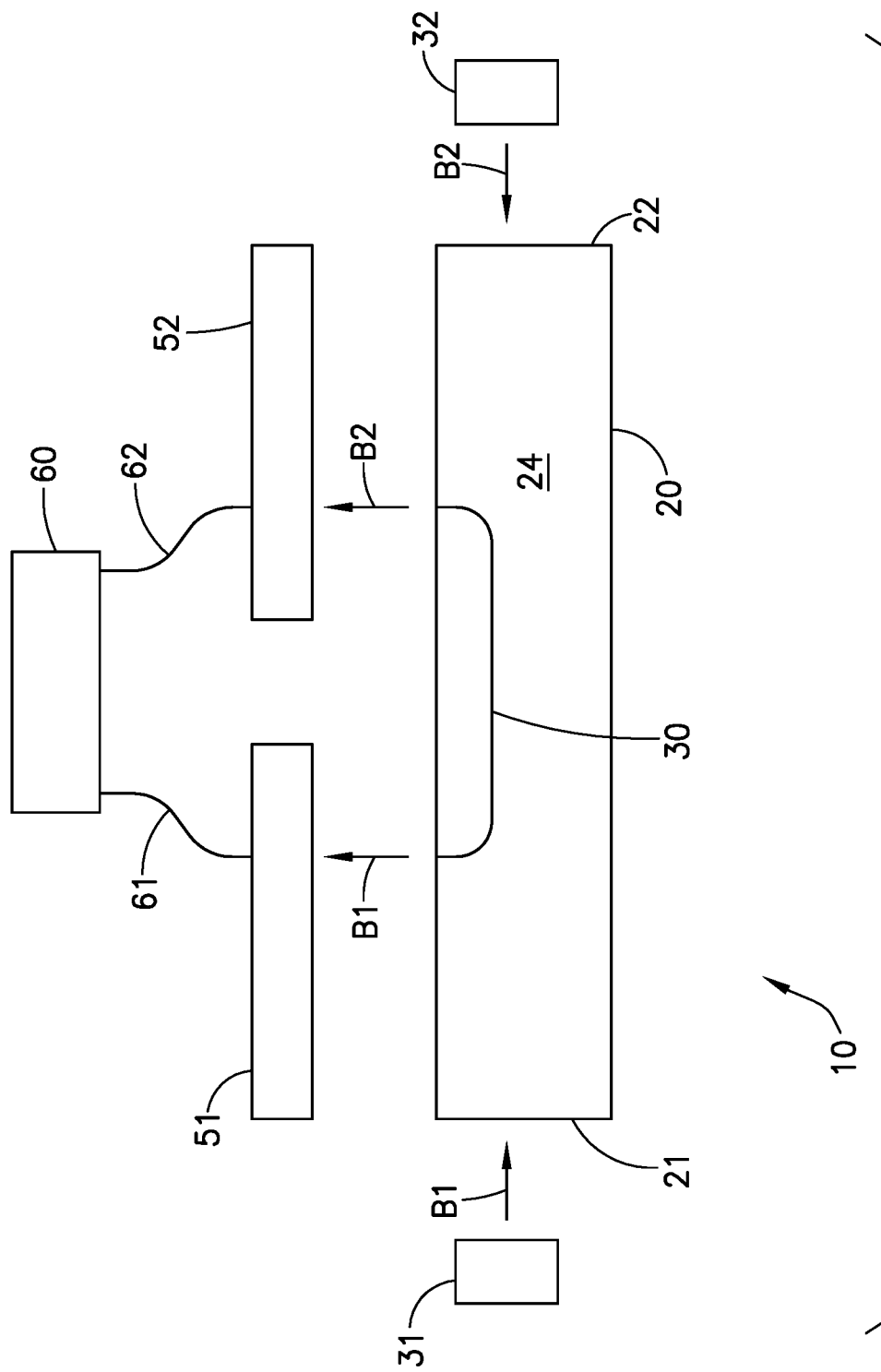
FIG. 1 is a schematic front elevational view of an electro-optical level apparatus in accordance with one embodiment of the invention.
Figure 2:
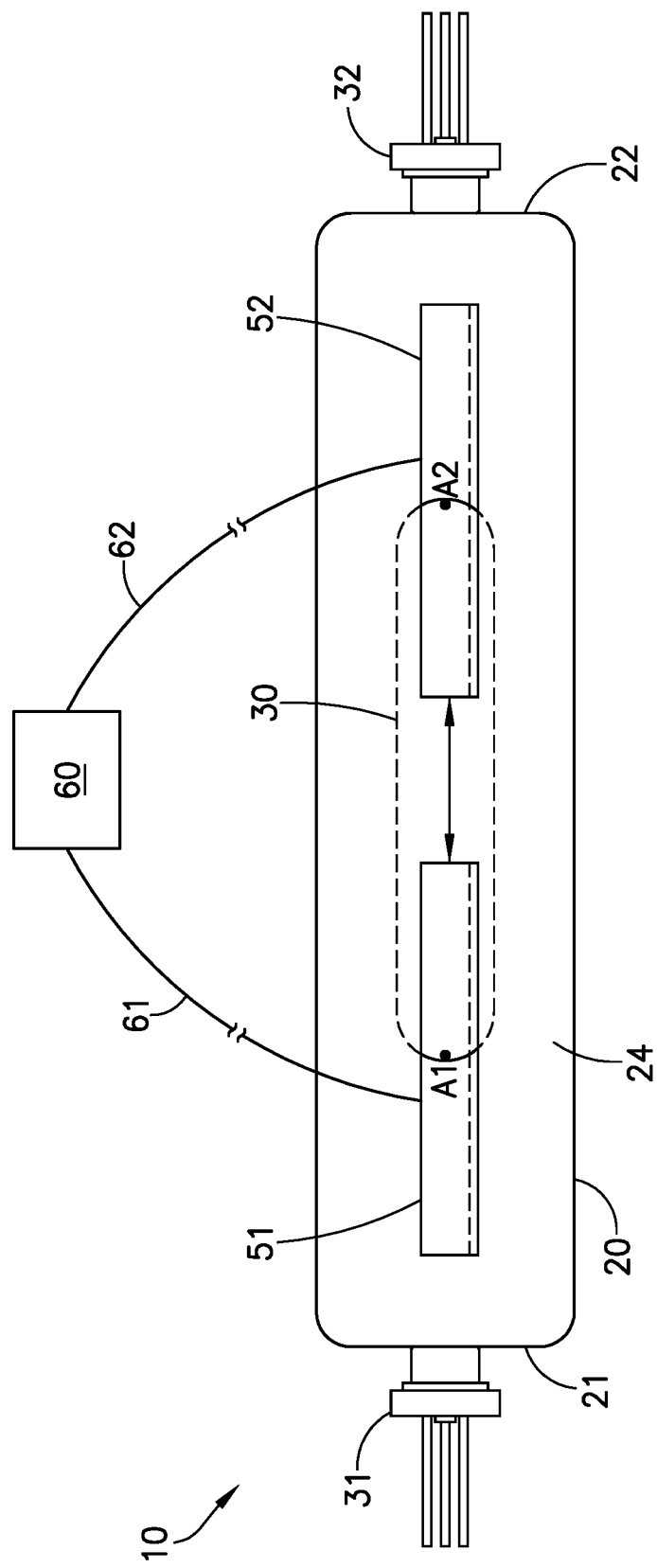
FIG. 2 is a schematic top elevational view of the electro-optical level apparatus of FIG. 1.

An electro-optical level apparatus in accordance with the invention is identified generally by the numeral 10 in FIGS. 1, 2, 4 and 5. The electro-optical level apparatus 10 includes a vial or bubble tube 20 having a barrel shape ground to the inside. The bubble tube 20 has opposite first and second longitudinal ends 21 and 22. A liquid 24 is disposed within the bubble tube 20 and forms a bubble 30. The bubble 30 will be positioned at the gravitational upper side of the bubble tube 20 and will be at a position between the first and second ends 21 and 22 of the bubble tube 20 that will be determined by the locations of the ends 21 and 22 relative to one another and along a gravitational axis. Thus, in a known manner, the bubble 30 will shift toward the first end 21 of the bubble tube 20 when the first end 21 is higher than the second end 22. Conversely, the bubble 30 will shift toward the second end 22 of the bubble tube 20 when the second end 22 is higher than the first end 21. The amount of shifting of the bubble 30 in the bubble tube 20 and hence the longitudinal position of the bubble in the bubble tube 20 is a function of the degree of levelness of the bubble tube 20.

The electro-optical level apparatus 10 further includes first and second light emitting diodes (LEDs) 31 and 32 in proximity respectively to the first and second ends 21 and 22 of the bubble tube 20. The first LED 31 is operative to direct a first beam B1 toward the first end 21 of the bubble tube 20, and the second LED 32 is operative to direct a second beam B2 toward the second end 22 of the bubble tube 20. The first and second LEDs 31 and 32 are positioned so that the first and second laser beams B1 and B2 are substantially coincident with the axis of the bubble 30. The LEDs 31, 32 may be operative to produce laser light or incoherent light.

Figure 3:
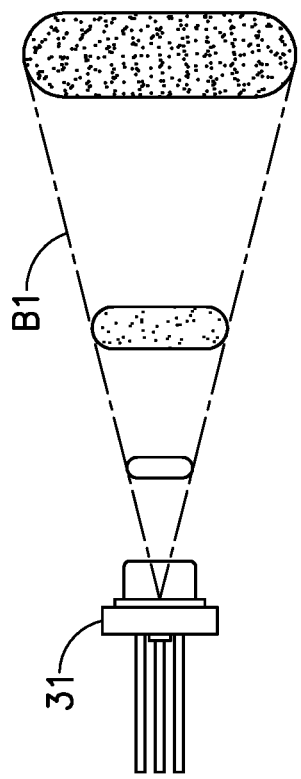
FIG. 3 is a schematic representation of an expanding beam produced by each expanding LED.
Figure 4:
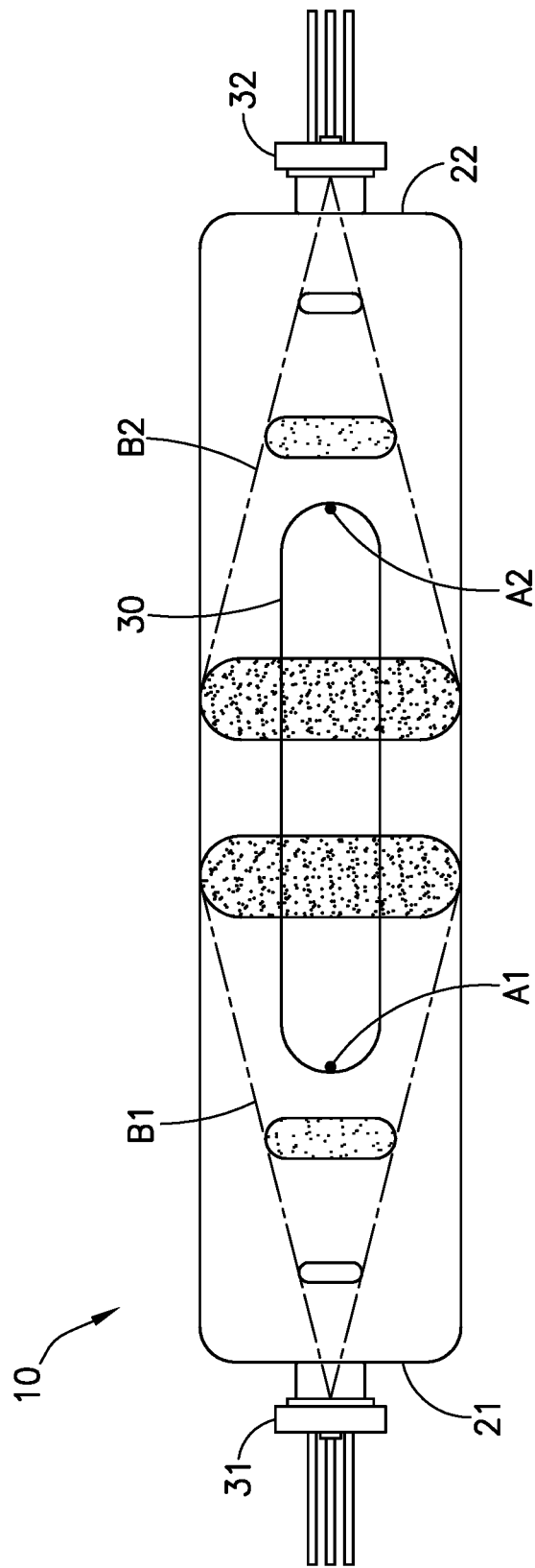
FIG. 4 is a schematic representation of the expanding beam of FIG. 3 superimposed on the electro-optical level apparatus of FIG. 2.
Figure 5:
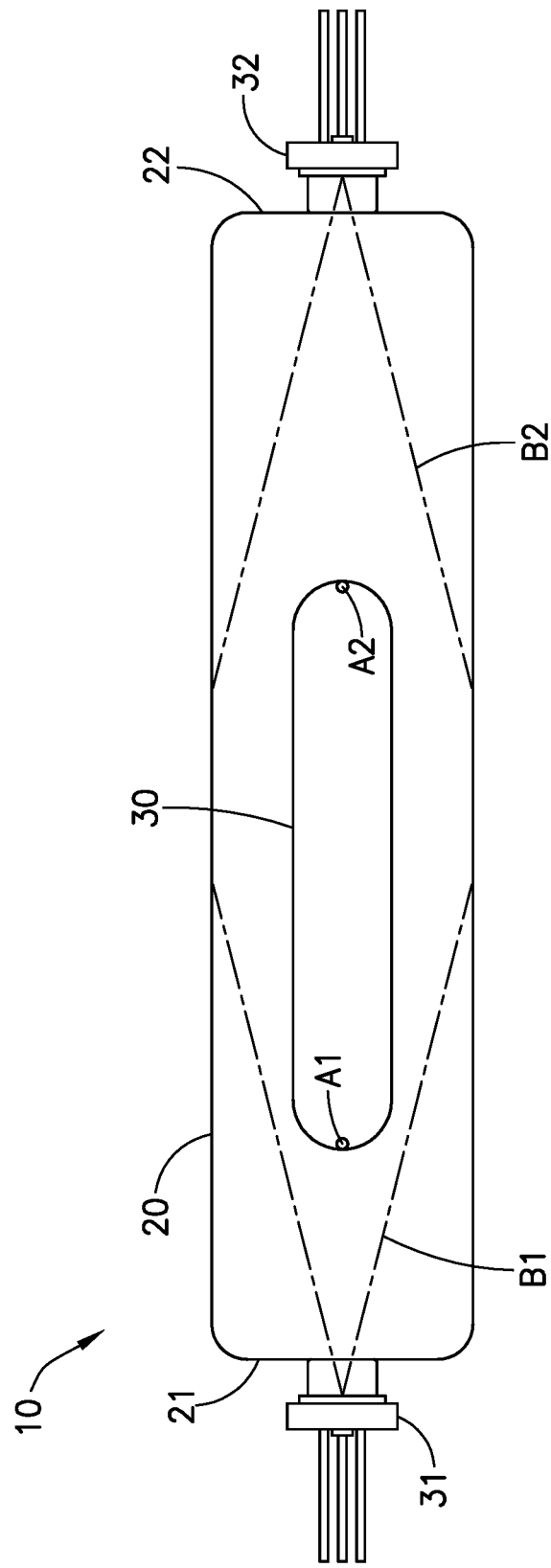
FIG. 5 is a schematic representation similar to FIGS. 1 and 3, but showing the bubble shifted toward the first end of the bubble tube due to an unlevel condition where the first end of the bubble tube is higher than the second end of the bubble tube.

The first and second LEDs 31 and 32 produce expanding beams B1 and B2, such as expanding laser beams, which are distinct from the collimated beams that are used for many laser alignment applications. FIGS. 3-5 schematically illustrates the light pattern produced by the LEDs 31 and 32. More particularly, each expanding beam B1, B2 will be brighter at positions closer to the respective LED 31, 32 and will be gradually less bright at positions farther from the respective LED 31, 32.

The beams B1, B2 will scatter upon impinging on the bubble 30 in the bubble tube 20. More particularly, the first beam B1 that impinges upon the first end 31 of the bubble 30 will scatter, and a portion of the scattered first beam B1 will be directed transverse to the axis of the bubble tube 20. Similarly, the second beam B2 that impinges on the second end 32 of the bubble 30 will scatter, and a portion of the scattered second beam B2 will be directed transverse to the axis of the bubble tube 20. The brightness of the beam B1 or B2 will depend on the brightness of the expanding beam B1, B2 at the point of impingement on the end of the bubble, which in turn is dependent upon the distance of the respective LED 31, 32 to the end of the bubble 30, and which further is dependent upon the degree of levelness of the bubble tube 20. The scattered beams B1, B2 will have equal brightnesses when the bubble is centered perfectly and the distances between the laser diodes 31, 32 and the bubble 30 are equal, thereby corresponding to a condition where the bubble tube is perfectly level. However, a shifting of the bubble tube 20 to a non-level condition will cause one beam B1 or B2 to become brighter while the other beam B1 or B2 will become correspondingly dimmer.

The electro-optical level apparatus 10 further includes first and second silicon cell detectors 51 and 52 aligned substantially parallel to the axis of the bubble tube 20 and offset equal distances from the bubble tube 20 in directions transverse to the axis of the bubble tube 20. The figures show the detectors above the bubble tube 20. However any position of the detectors 51, 52 is possible as long as the detectors are parallel to the axis of the tube 20. Additionally, the positions of the first and second detectors 51 and 52 relative to one another in directions parallel to the axis of the bubble tube 20 and relative to the ends of the bubble tube 20 are known. The portion of the scattered beams B1 and B2 corresponding to the respective first and second ends 31 and 32 of the bubble 30 will form clearly identifiable spots A1 and A2 on the detectors 51 and 52 respectively. The first and second detectors 51 and 52 effectively see and detect the bright spots A1, A2 corresponding to the ends 31, 32 of the bubble 30. The brightness of each respective bright spot A1, A2 is dependent on the axial position of the bubble 30 relative to the expanding beam B1, B2, and that position of the bubble 30 is dependent upon the degree of levelness of the bubble tube 20. Each detector 51, 52 generates a voltage that is proportional to the brightness of the beam B1 or B2 impinging thereon. Thus, as the bubble tube 20 shifts in alignment relative to a plane perpendicular to the gravitational axis, the brightness of the spot A1, A2 produced by each scattered beam B1, B2 will vary. The voltages produced by the detectors 31, 32 vary in accordance with the brightness of the spot A1, A2 corresponding to respective scattered beam B1, B2, and hence in accordance with the degree of levelness.

The electro-optical level apparatus 10 further includes a control unit 60 that communicates with the first and second detectors 51 and 52 via data cables 61 and 62. Data identifying the voltage and hence the brightness of the first and second beams B1 and B2 corresponding to the opposite first and second ends 31 and 32 of the bubble 30 is transmitted to the control unit 60 via the cables 61, 62. The control unit 60 compares the respective voltages at the first and second detectors 51 and 52 and determines the degree of levelness based on that comparison. More particularly, the control unit 60 performs calculations to determine the relative position of the bubble 30 in the bubble tube 20 based on the voltages and uses that positional data of the bubble 30 in the bubble tube 20 to determine levelness of the bubble tube 20. These calculations are not dependent upon dimensional changes of the bubble tube 20 or the bubble 30 due to changes in temperature. The detectors 51, 52 are capable of measuring movements of the spot of 0.0001 inch, which corresponds to a theoretical resolution of ¹⁄₄₀th arc-second. That theoretical accuracy may be limited by manufacturing tolerances, but accuracy of 0.1 arc second are practical and achievable within the available manufacturing tolerances.

In the context of this disclosure, a "control unit" can be understood to include, for example, a processor and/or a storage unit or memory for storing algorithms and program commands. By way of example, the processor and/or the control unit is specifically configured to carry out program commands in such a way that the processor and/or the control unit carries out functions to implement or realize a method as disclosed herein or a step of a method as disclosed herein. The term control unit is used here synonymously with devices known from the prior art. A control unit, therefore, encompasses a "computer" and accordingly comprises one or more general-purpose processors (CPUs) or microprocessors, RISC processors, GPUs and/or DSPs. The control unit or computer has for example additional elements such as storage interfaces of communication interfaces. Optionally or additionally, the terms "control unit" and "computer" refer to a device that is capable of executing a provided or included program, preferably with standardized programming language (for example C++, JavaScript or Python), and/or of controlling and/or accessing data storage devices and/or other devices such as input interfaces and output interfaces. The term computer also refers to a multiplicity of processors or a multiplicity of (sub)computers that are interconnected and/or connected and/or otherwise communicatively connected and possibly share one or more other resources, such as for example a memory.

In the context of this disclosure, a "storage unit" can be understood to mean, for example, a volatile memory in the form of random access memory (RAM) or a permanent memory such as a hard disk drive or a data medium or, for example, a replaceable storage module or a cloud-based storage solution.

Figure 6:
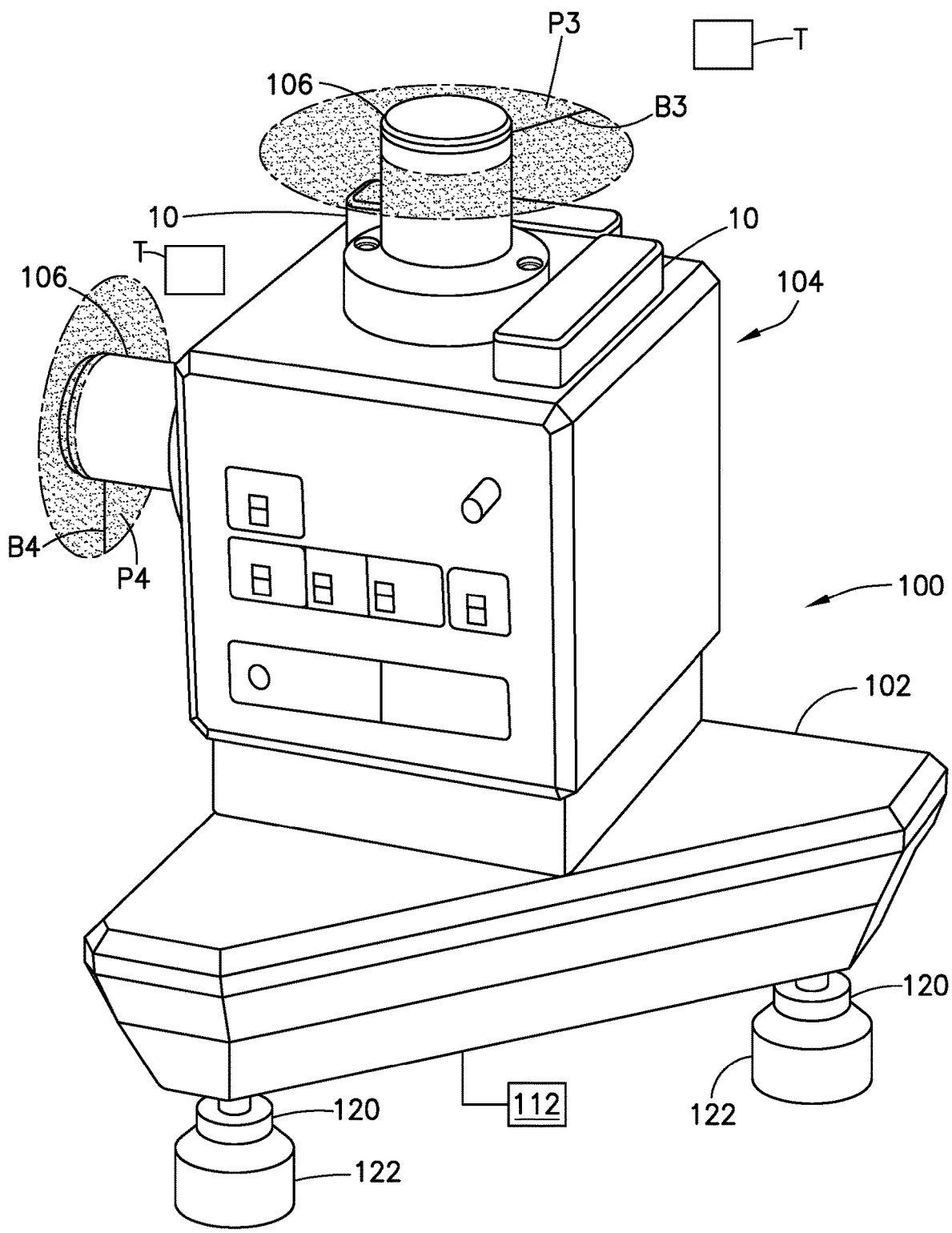
FIG. 6 is a schematic representation of a laser alignment apparatus that includes the electro-optical level apparatus of FIG. 1.

Known laser alignment devices, such as the Hamar Laser Model 743, accurately align objects relative to a known frame of reference. That frame of reference often is a horizontal line, a horizontal plane, a vertical axis and or a vertical plane. U.S. Pat. Nos. 6,038,050 and 6,292,303 disclose laser alignment devices that can generate plural perpendicular beams and/or a rotating laser beam that produces a plane that is perpendicular to a laser beam extending along an axis of rotation of the rotating beam. The disclosures of U.S. Pat. Nos. 6,038,050 and 6,292,303 are incorporated herein by reference. The known laser alignment devices often use a bubble level that is observed visually by a human operator who then manually adjusts the known laser alignment device into a substantially horizontal plane. However, the electro-optical level apparatus 10 disclosed herein can be used in conjunction with or as part of the known laser alignment device to achieve an initial leveling of the known laser alignment device before performing the laser alignment. For example, FIG. 6 shows a laser alignment apparatus 100 with a base 102 and a laser emitter 104 with at least one laser diode, at least one collimating lens and two rotating pentaprisms 106. Each collimating lens produces a collimated laser beam B3, B4 that impinges on the respective pentaprism 106, and each pentaprism 106 internally reflects the incoming collimating laser beam B3, B4 ninety degrees. Additionally, each pentaprism 106 rotates about an axis that is coincident to the incoming collimated beam. Thus, the beam B3, B4 reflected by the pentaprism 106 effectively sweeps a plane P3, P4 that is perpendicular to the collimated beam that enters the respective pentaprism. The beam B3 will sweep a plane P3 parallel to the base 102 and the beam B4 will sweep a plane P4 perpendicular to the base 102. The laser alignment apparatus 100 is used with one or more targets T that can sense the center of energy of the collimated beam B3 or B4 impinging thereon and a control module 112 to determine linear offsets and/or angular misalignments of the the beam B3 relative to the targets 110.

The laser alignment apparatus 100 of FIG. 6 further includes one or preferably two of the electro-optical level apparatuses 10 described above mounted on the laser emitter 104 (or alternatively on the base 102). The bubble tubes 20 of the two electro-optical level apparatuses 10 described above are aligned with their axes perpendicular to one another and parallel to the base 102. The laser level apparatuses 10 are used to align the base 102 perpendicular to a gravitational axis and hence ensure that the laser plane P3 swept by the beam B3 is perpendicular to a gravitational axis and that the laser plane P4 swept by the beam B4 is parallel to a gravitational axis. Unlike the prior art laser alignment apparatus, the apparatus 100 further has servo motors 120 that cooperate with extendable and retractable legs 122. The control unit 112 will cause the servo motors 120 to extend or retract the legs 122 until the brightness of the spots A1, A2 sensed by the detectors 51, 52 described above are equal to one another. These adjustments may be based on calculations carried out by the control unit 112, adjustments stored in a memory or mere iterative adjustments. For example, a memory may store adjustments appropriate for each of the possible non-level readings, and the control unit 112 then will cause the servo motors 120 to make adjustments stored in the memory for the corresponding non-level condition. Alternatively, iterative adjustments may be carried out until the spots A1, A2 are of equal brightness, thereby corresponding to substantially perfect levelness. The adjustments may be carried out sequentially for the two electro-optical levels 10 mounted on the laser alignment apparatus 100. The adjustments may be carried out again to determine if adjustments carried out based on readings from the second electro-optical level may have affected adjustments made based on reading from the first electro-optical level The invention has been described with respect to a preferred embodiment. However, changes can be made without departing from the scope of the invention. For example, a single detector that is capable of identifying plural points of impingement can be employed. Alternatively, plural pairs of detectors can be provided at different respective sides of the bubble tube. A hard wire connection between the detectors and the control unit is illustrated, but wireless communications are possible using conventionally available wireless signal transmission equipment. The electro-optical level has been described as being used with a laser alignment apparatus, but can be used with other apparatuses that should be level before use, such as drilling equipment and aerospace launch platforms to name a few. The illustrated embodiments referred to the use of an expanding light beams and detectors that determine the degree of levelness by the brightness of the respective light reflected from the opposite respective ends of the bubble. However, equally effective devices can imply a collimated laser beam and detectors to identify the positions of the center of energy of the reflected collimated laser beam.

What is claimed:

1. A level, comprising:
a tube having opposite first and second axial ends with first and second transparent closures at the respective first and second axial ends, a liquid contained in the tube and a bubble being defined in the tube by an area that is not filled by the liquid;
first and second light emitters in proximity respectively to the first and second axial ends of the tube and configured respectively to direct first and second beams through the respective first and second transparent closures and toward opposite first and second ends of the bubble; and
first and second light sensors offset from the tube and disposed so that parts of the respective first and second beams reflected by the bubble impinge respectively upon the first and second light sensors.

2. The level of claim 1, wherein the first and second light emitters are disposed so that axes of the first and second beams are substantially coaxial.

3. The level of claim 1 wherein the first and second light emitters are equal distances from the respective first and second ends of the tube.

4. The level of claim 1, wherein the first and second light emitters are first and second LEDs.

5. The level of claim 4, wherein the first and second LEDs are expanding LEDs that produce expanding patterns of light energy.

6. The level of claim 4, wherein the first and second LEDs are laser LEDs.

7. The level of claim 6, wherein the first and second light sensors are silicon cell detectors that produce voltages proportional to brightnesses of light impinging thereon.

8. The level of claim 1, further comprising a control unit connected with the light sensors and operative to calculate alignment of the tube based on voltages detected respectively by the first and second light sensors.

9. An apparatus, comprising:
the level of claim 8;
servo motors connected to the control unit; and
height-adjustable supports connected respectively to the servo motors, wherein the servo motors adjust the respective height-adjustable supports based on output of the light sensors to adjust the apparatus into a level alignment.

10. A laser alignment apparatus, comprising:
a base;
a laser emitter mounted on the base and configured to emit at least one alignment laser beam;
at least one target to determine a location of impingement of the at least one alignment laser beam on the target; and at least one level mounted on the base, the at least one level including:

a tube having opposite first and second axial ends with first and second transparent closures at the respective first and second axial ends, a liquid contained in the tube and a bubble being defined in the tube by an area that is not filled by the liquid;

first and second light emitters in proximity respectively to the first and second axial ends of the tube and configured respectively to direct first and second beams through the respective first and second transparent closures and toward opposite first and second ends of the bubble; and first and second light sensors offset from the tube and disposed so that parts of the respective first and second beams reflected by the bubble impinge respectively upon the first and second light sensors.

11. The laser alignment apparatus of claim 10, wherein the at least one level comprises first and second levels aligned perpendicular to one another.

12. The laser alignment apparatus of claim 11, further comprising servo motors and height-adjustable supports connected respectively to the servo motors for adjusting alignment of the laser alignment apparatus based on output of the light sensors of each of the first and second levels.

13. The laser alignment apparatus of claim 12, further comprising a control unit connected to the light sensors of each of the first and second levels and to the servo motors for actuating the servo motors to move the height-adjustable supports until the laser alignment apparatus is level.

\* \* \* \* \*